United States Patent [19]

Ohuchi

[11] Patent Number: 5,197,119

[45] Date of Patent: Mar. 23, 1993

[54] EXTERNAL SYNCHRONISM CONTROL CIRCUIT

[75] Inventor: Mitsurou Ohuchi, Tokyo, Japan

[73] Assignee: NEC Corporation, Tokyo, Japan

[21] Appl. No.: 633,376

[22] Filed: Dec. 26, 1990

[30] Foreign Application Priority Data

Dec. 25, 1989 [JP] Japan .................................. 1-337460

[51] Int. Cl.$^5$ .......................................... G06K 15/00
[52] U.S. Cl. ................................... 315/115; 395/166; 395/106
[58] Field of Search ............... 395/115, 106, 166, 116, 395/164; 340/724, 744, 798–801; 346/154; 358/261.4, 444, 409–410, 412

[56] References Cited

U.S. PATENT DOCUMENTS

5,067,097  11/1991  Yamazaki et al. .................. 395/115

Primary Examiner—Arthur G. Evans
Attorney, Agent, or Firm—Whitham & Marhoefer

[57] ABSTRACT

An external synchronism control circuit is triggered in synchronism with an external synchronous signal so as to successively generate addresses to an image memory storing image information. The external synchronism control circuit comprises a synchronism register receiving the external synchronous signal and capable for holding a plurality of set values. When the external synchronous signal is applied, the synchronism register is initialized to be set with an initial value of the plurality of set values. The content of the synchronism register is updated from one set value to another set value when a predetermined period of time has elapsed. When the content of the synchronism register is updated to a final value of the plurality of set values, the synchronism register operates to maintain the final value until a next external synchronous signal is applied. An address controlling circuit operates sequentially update the address to be supplied to the memory, from a period in which the synchronism register holds a predetermined set value of the plurality of set values until a period in which the synchronism register is in a condition of holding the final value, so that the updated address is supplied to the memory.

9 Claims, 4 Drawing Sheets

EXTERNAL SYNCHRONISM CONTROL CIRCUIT

BACKGROUND OF THE INVENTION

1. Field of the Invention

The present invention relates to a data processing system for outputting information stored in an image memory, to an output apparatus such as a CRT (cathode ray tube) display and a printer, and more specifically to an external synchronism control circuit for generating a display or print address to the image memory in synchronism with an external synchronous signal supplied from an external apparatus.

2. Description of Related Art

In general, an external synchronism control circuit is required when display information from a plurality of display control apparatuses is displayed in one display. In personal computers that are now widely used, a character image indicative of character information and a graphic image indicative of a graphic pattern such a straight line and a circle are generated by different hardware, respectively, and thereafter, the generated character image and the generated graphic image are finally superimposed so that the superimposed image is displayed on the display. In order to properly display the character image and the graphic image on the same display in a superimposed manner, the display information starting from a upper left corner of a display screen is required to be in synchronism between the character image and the graphic image supplied from the different hardware. For this purpose, a so called "external synchronism control method has been adopted, in which a CRT control signal output from a character display hardware is supplied to a graphic display hardware, so that the graphic display hardware generates a display address in synchronism with the received CRT control signal. In this connection, it is an ordinary practice that the means generating the CRT control signal is called a "master", and the means operating in synchronism with the received CRT control signal is called a "slave".

In the prior art, on the other hand, in order to obtain a hard copy of the image displayed on the CRT display, all contents of an image memory provided in a host computer has been transferred to a printer through a communication line or channel. However, the data transfer amount has greatly increased with an increased resolution, with the result that a required data transfer time has become long in comparison with a printing speed of the printer. In order to overcome this problem, it has become a recent dominant practice to transfer only character and graphic information to be displayed, not all the content of the image memory, so that the transferred character and graphic information is written once in an image memory internally provided in the printer, and thereafter, the content of the image memory internally provided in the printer is printed out.

In order the realize the above mentioned recent dominant practice, a printer is required to internally comprise not only an image memory but also a function for writing character information and graphic information into the internal image memory of the printer, on the basis of the character information and the graphic information supplied from the host computer. Here, the writing of character information and graphic information into the internal image memory can be considered to correspond to a depiction of characters and graphic patterns onto the image memory, namely, onto an imaginary plane established by a memory space of the image memory. In addition, an external synchronism function is required to read out data from the image memory storing the character information and the graphic information to be printed, in harmony with the printing speed of the printer.

So-called CRT controller LSIs (large scale integrated circuits) now commercially available comprise not only a function for generating a synchronous signal to the CRT display, but also a function for receiving the character and graphic information and writing the received character and graphic information into the image memory. Therefore, the CRT controller LSIs are now used in the printers.

However, since the external synchronism control of the CRT controller LSIs has been basically designed to comply with the CRT display, it is not sufficient to control the printer. Namely, an essential difference between the CRT control signal and the printer control signal is that the CRT control signal is supplied at constant intervals of time, while the printer control signal has an irregular periodicity in accordance with a processing speed of a printing mechanism in the printer.

Figure 1:
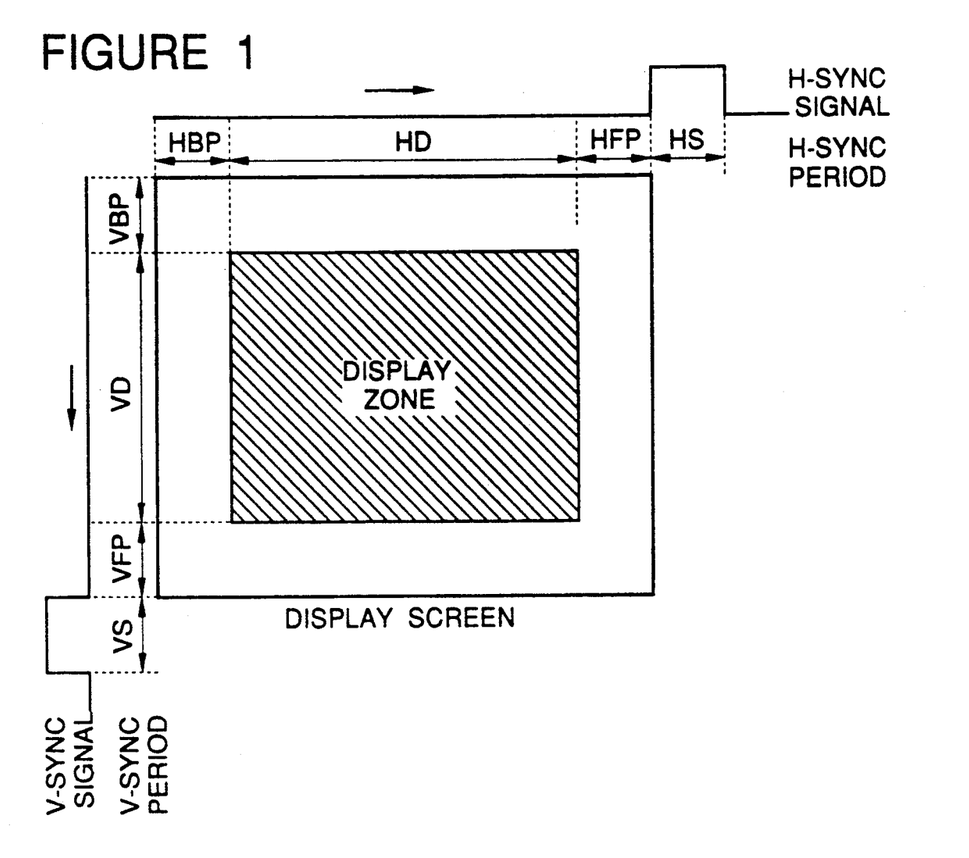
FIG. 1 illustrates two kinds of synchronous signal for the CRT display.

Here, the CRT synchronism signal will be described in detail with reference to FIG. 1. As seen from FIG. 1, the CRT display is controlled by two kinds of control signal, namely, vertical synchronous signal and a horizontal synchronous signal. When the vertical synchronous signal is applied, a display position or point is moved to an uppermost position in a display screen, and on the other hand, the display position is moved to a leftmost position in the display screen. In a period of time in which these synchronous signals are not applied, the display position is automatically shifted from left to right and from an upside to a lower side at predetermined speeds, respectively. The CRT controller LSI operates to output the above mentioned two kinds of synchronous signals and to output to the image memory a display address corresponding to the display position.

Figure 2:
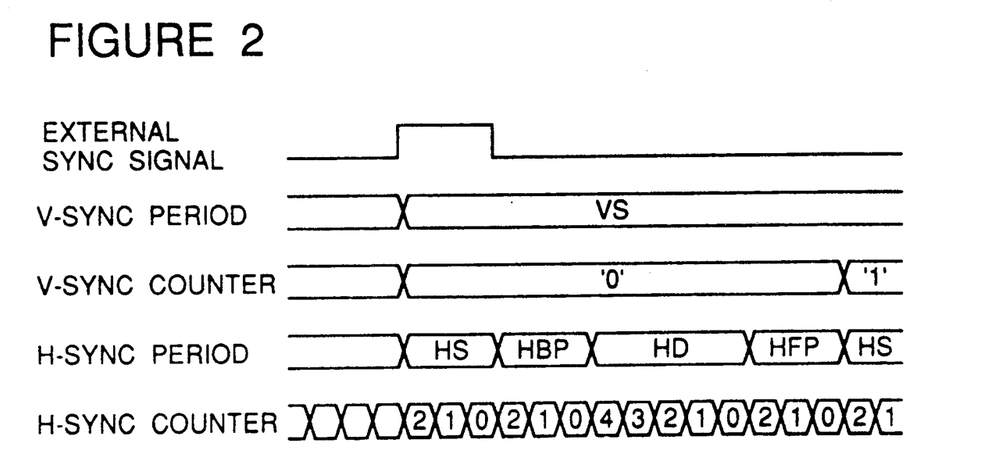
FIG. 2 is a timing chart illustrating the external synchronism timing realized by the CRT controller LSI.

Referring to FIG. 2, there is shown a timing chart illustrating the external synchronism timing realized by the CRT controller LSI. An external synchronous signal is the same as the vertical synchronous signal supplied to the CRT display. If the external synchronous signal is supplied to the CRT controller LSI, an internal vertical synchronism pointer is initialized to a VS (vertical synchronism) period, and an internal horizontal synchronism pointer is initialized to a HS (horizontal synchronism) period. At the same time, an internal vertical synchronism counter and an internal horizontal synchronism counter are also initialized. Thereafter, the horizontal synchronism counter is decremented by each clock from a predetermined value, and when a content of the horizontal synchronism counter reaches 0 (zero), the horizontal synchronism pointer is caused to change into a HBP (horizontal back porch) period. With further updatings of the horizontal synchronism counter, the horizontal synchronism pointer is caused to sequentially change to a HD (horizontal display) period, a HFP (horizontal front porch) period, and the HS period in the named order. The transition from the HFP period to the HS period is executed automatically. Namely, it is not necessary to supply the horizontal synchronism signal as the external synchronous signal. This is based on the premise that the advancement of the internal synchronism processing is consistent with the time interval of the application of the horizontal synchronous signal to the CRT display.

On the other hand, each time the horizontal synchronism pointer is brought into the HS period, the vertical synchronism counter is decremented from a predetermined value, and when a content of the vertical synchronism counter reaches 0 (zero), the vertical synchronism pointer is caused to change into a VBP (vertical back porch) period. Similarly, the vertical synchronism pointer is caused to sequentially change to a VD (vertical display) period, a VFP (vertical front porch) period, and the VS period.in the named order.

A sum of the "VFP", "VS" and "VBP" periods is called a vertical blanking interval (corresponding to an upper side portion and a lower side portion of a display screen), and a sum of the "HFP", "HS" and "HBP" periods is called a horizontal blanking interval (corresponding to a left side portion and a right side portion of the display screen). In these blanking period, a display is not performed. On the other hand, the display address is outputted only during the "HD" periods in the "VD" period, which correspond to a display zone at a center portion of the display screen. The value of the display address is updated with predetermined intervals. Thus, it is possible to supply the display data having a constant relation to the display position of the display screen.

In the external synchronism control method adopted in the conventional CRT controller LSI, it is sufficient if only the external synchronous signal is supplied with predetermined intervals as mentioned above, and no horizontal synchronous signal is required. Because of this reason, the conventional CRT controller LSI could not comply with an external synchronous signal which is supplied at irregular intervals and with units of one line, as is required in the printer. Therefore, in the case of using the conventional CRT controller LSI for the external synchronism control of printers and similar apparatuses, additional circuits for a refresh control, printing address generation and others are required independently of the CRT controller LSI. This is not convenient for mass production, and has increased a cost of the printer. Furthermore, many of the conventional CRT controller LSIs allow the utilization of only the function of writing the character and graphic data. In these conventional CRT controller LSIs, it has been required to realize the function of writing the character and graphic data by means of other additional circuits.

SUMMARY OF THE INVENTION

Accordingly, it is an object of the present invention to provide an external synchronism control circuit which has overcome the above mentioned defect of the conventional one.

Another object of the present invention is to provide an external synchronism control circuit capable of utilizing the functions of a CRT controller LSI as they are, without no additional circuit, and capable of complying with both of a CRT display and a printer.

The above and other objects of the present invention are achieved in accordance with the present invention by an external synchronism control circuit triggered in synchronism with an external synchronous signal so as to successively generate addresses to a memory storing image information, comprising a synchronism register receiving the external synchronous signal and capable of holding a plurality of set values, means for setting a content of the synchronism register to an initial value of the plurality of set values when the external synchronous signal is applied, means for updating the content of the synchronism register from one set value to another set value when a predetermined period of time has elapsed, the updating means operating, when the content of the synchronism register is updated to a final value of the plurality of set values, to maintain the final value until a next external synchronous signal is applied, and means for sequentially updating the address from a period in which the synchronism register holds a predetermined set value of the plurality of set values until a period in which the synchronism register is in a condition of holding the final value, the address updating means supplying the updated address to an external device.

With the above mentioned arrangement, the horizontal synchronous signal is inputted as a second external synchronous signal, so that a horizontal synchronism control pointer is initialized by the horizontal synchronous signal. Furthermore, after the horizontal synchronism control pointer has searched the "HBP" period, the condition is maintained until the horizontal synchronous signal is input. This makes it possible to generate a display (printing) address in time with application of the horizontal synchronous signal. Therefore, it is possible to read image data from the image memory at timings in matching with a printing speed of the printing hardware mechanism of the printer. As a result, it becomes easy to use the CRT controller LSI as the printer controller, and therefore, to miniaturize the printer hardware and to elevate performance of the printer hardware.

The above and other objects, features and advantages of the present invention will be apparent from the following description of preferred embodiments of the invention with reference to the accompanying drawings.

DESCRIPTION OF THE PREFERRED EMBODIMENTS

Figure 3:
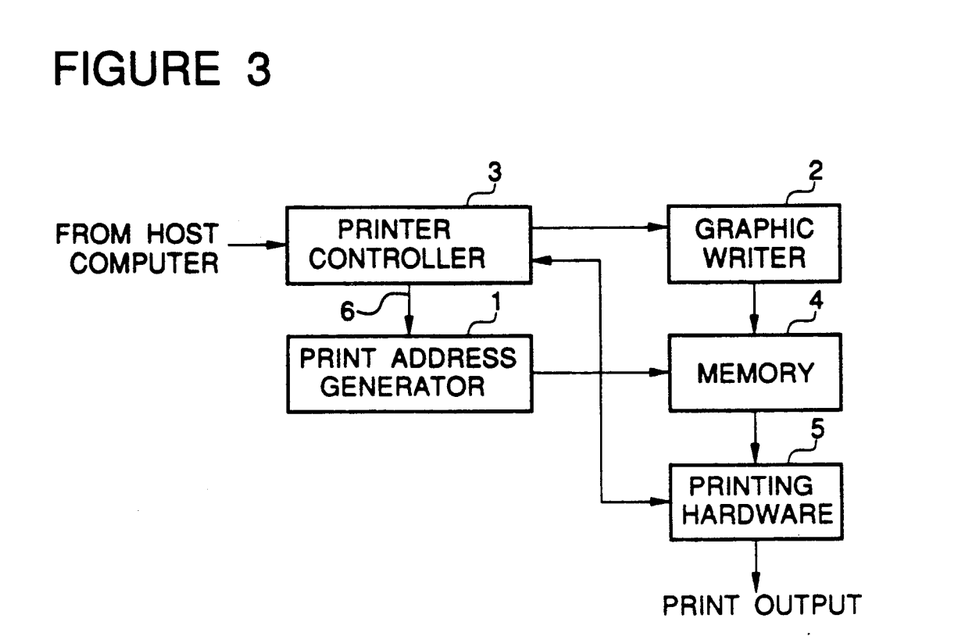
FIG. 3 is a block diagram of an overall structure of a printer system which can incorporate the external synchronism control circuit in accordance with the present invention.

Referring to FIG. 3, there is shown a block diagram of an overall structure of a printer system which can incorporate the external synchronism control circuit in accordance with the present invention. The shown printer system is designed to write character and graphic information into an internal image memory, on the basis of character and graphic information supplied or transferred from a host computer (not shown), and to print out a content of the internal image memory. o For this purpose, the printer system includes a print address generator 1, a graphic information writer 2, a printer controller 3, an internal memory 4, a printing hardware 5 and a data bus 6. Information including character and graphic information and control information, which is supplied from the host computer, is inputted to the printer controller 3, where the character and graphic information is extracted and then transferred to the graphic information writer 2. On the basis of the given character and graphic information, the graphic information writer 2 writes character and graphic information into the internal memory 4. After all the character and graphic information is inputted to the printer controller 3, when a print control information is inputted, the printer controller 3 outputs an initial address value, a reset signal and an external synchronous signal to the print address generator 1 through the data bus 6. At the same time, the printer controller 3 outputs a print start signal to the printing hardware 5. A print address generated by the print address generator is inputted to the internal memory 4, and data read out of the internal memory 4 is supplied to the printing hardware 5, so that the data is printed out.

Figure 4:
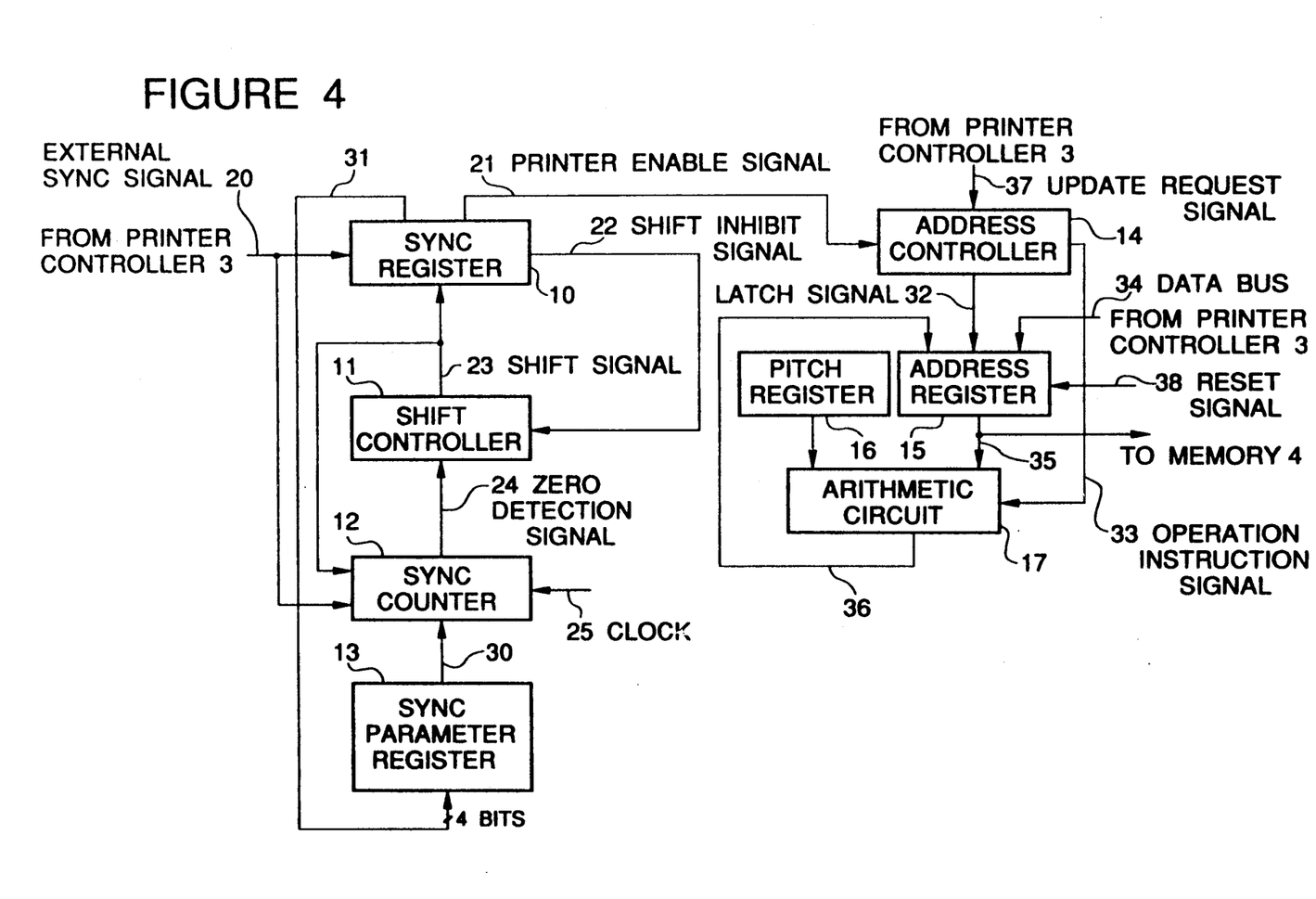
FIG. 4 is a block diagram of a first embodiment of the external synchronism control circuit in accordance with the present invention.

Referring to FIG. 4, there is shown a block diagram of the print address generator 3 embodying the external synchronism control circuit in accordance with the present invention, which operates on the basis of an external synchronous signal supplied from the printer controller 3 at irregular intervals.

The print address generator 1 includes a synchronism register 10, a shift controller 11 for the synchronism register 10, a synchronism counter 12, a synchronism parameter register 13, an address controller 14, an address register 15, a pitch register 16 and an arithmetic circuit 17. An external synchronous signal 20 is inputted to the synchronism register 10 and the synchronism counter 12 with units of one line. The synchronism register 10 generates a print enable signal 21 and a shift inhibit signal 22, and on the other hand, the shift controller 11 generates a shift signal 23. In addition, the synchronism counter 12 generates a zero detection signal 24, and receives a clock 25. The synchronism counter 12 is also coupled to the synchronism parameter register 14 through a synchronism parameter bus 30. The synchronism parameter register 14 is coupled to the synchronism register 10 through a synchronism parameter address bus 31. A latch signal 32 is supplied from the address controller 14 to the address register 15, and an operation instruction signal 33 is applied to the arithmetic circuit 17 from the address controller 14. The address register 15 is coupled to the printer controller 3 through a data bus 34, and also coupled to one input of the arithmetic circuit 17 through a data bus 35. An output of the arithmetic circuit 17 is coupled to the address register 15 through a data bus 36. Furthermore, the address controller 14 receives an update request signal 37 from the printer controller 3. The address register 15 receives a reset signal 38. Here, the external synchronous signal 20 corresponds to the horizontal synchronous signal of the CRT display, and the reset signal 38 corresponds to the vertical synchronous signal. The external synchronous signal 20 and the reset signal 38 are supplied through the data bus 6 from the printer controller 3.

An initial value of the synchronism counter 12 is given or set by the synchronism parameter register 13 which stores time widths corresponding to the "HS", "HBP", "HD" and "HEP" periods defined hereinbefore for the horizontal synchronism. The synchronism counter 12 is decremented from the set initial value by each of the clocks 25. If a content of the synchronism counter 12 becomes "0" (zero), the synchronism counter 12 activates the zero detection signal 24. When the zero detection signal 24 is activated, the synchronism counter 12 is set with one content of the synchronism parameter register 13 through the synchronism parameter bus 30 by using as a load signal either the shift signal 23 output from the shift controller 11 or the external synchronous signal 20.

On the other hand, an address of the synchronism parameter register 13 is given by an output of the synchronism register 10. Namely, the synchronism register 10 outputs an address of four bits through the synchronism parameter address bus 31, and one word of information corresponding to the given address is selected in the synchronism parameter register 13 and then output to the synchronism parameter bus 30 from the synchronism parameter register 13.

The synchronism register 10 is composed of a four-bit shift register, and is initialized to an initial value "0001" when the external synchronous signal 20 is activated, for example when the printing hardware has completed a printing of one line unit. The content of the synchronism register 10 is shifted at each time the shift signal 23 is activated, so that the content of the synchronism register is caused to sequentially change to "0010", "0100", and "1000" in the named order. "0001" indicates the "HS" period, and "0010", "0100", and "1000" show the "HBP", "HD" and "HFP" periods, respectively. This four-bit signal indicative of the content of the synchronism register 10 is supplied through the synchronism parameter address bus 31 to the synchronism parameter register 13.

The print enable signal 21 is activated by the synchronism register 10 when the content of the synchronism register 10 shows the "HD" period, and the shift inhibit signal 22 is activated by the synchronism register 10 when the content of the synchronism register 10 shows the "HFP" period. Therefore, the shift signal 23 is activated only when the zero detection signal 24 outputted from the synchronism counter 12 is active and the shift inhibit signal 22 is inactive. Therefore, during the "HFP" period, since the shift inhibit signal 22 is maintained inactive, it does not move from the "HFP" period to the "HS" period until the printing hardware has completed the printing of one line unit, namely unless the external synchronous signal 20 is activated.

A required address is given by cooperation of the address controller 14, the address register 15 and the pitch register 16, both of which are 24-bit registers, and the arithmetic circuit 17. The address register 15 operates to hold a content of the printing address, and latches a content of the data bus 34 when the reset signal 38 is activated. The pitch register stores the number of words to be added to the address register 15 when starting a new line (or paragraph). These registers 15 and 16 and the arithmetic circuit 17 are controlled by the address controller 14. On the basis of the print enable signal 21, the address controller 14 generates the latch signal 32 for the address register 15, and the operation instruction signal 33 for the arithmetic circuit 17.

Figure 5:
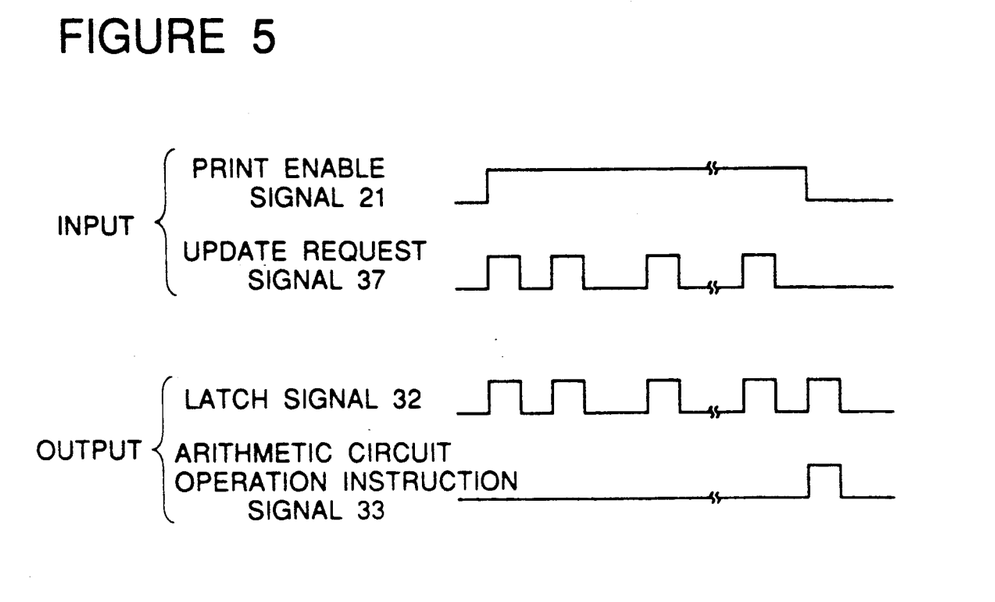
FIG. 5 is a timing chart illustrating address generation timing.

Timings of these signals will be described with reference to FIG. 5. As seen from FIG. 5, during a period in which the print enable signal 21 is active, namely during the "HP" period, the address update request signal 37 is activated at each time there has been completed the printing of data read out of the memory 4 in accordance with the print address outputted through the data bus 35. The latch signal is activated when the address update request signal 37 is activated or when the operation instruction signal 33 is activated. The operation instruction signal 33 is activated when the print enable signal 21 changes from the active condition to the inactive condition, namely, one time at completion of each one line printing. The operation instruction signal 33 is maintained at a low level at times other than the above timing.

The reset signal 38 is inputted from the printer controller 3 at the beginning of one line printing. In response to the reset signal 38, the address register 15 is set with an initial value supplied from the printer controller 3 through the data bus 34. When the operation instruction signal 33 is at the low level, the arithmetic circuit 17 operates to increment the content of the address register 15. On the other hand, when the operation instruction signal 33 is at a high level, namely, when one line printing has been completed, the arithmetic circuit 17 operates to add the content of the pitch register 16 to the content of the address register 15. Accordingly, when data of one line is printed out, the address register is incremented until all of addresses corresponding to one line have been generated, and after completion of the one line printing, the content of the address register 15 is added with the content of the pitch register 16 in order to obtain a head address for a next line. The arithmetic circuit 17 is configured to ceaselessly output the result of the arithmetic operation to the data bus 36, so that the result of the arithmetic operation is latched in the address register 15 when the latch signal 32 is active. The address latched in the address register 15 is output to the memory 4 through the data bus 35, so that the printing data is output from the memory 4 to the printing hardware 5 and printed out by the printing hardware 5.

As seen from the above, the above mentioned embodiment is constructed such that for a period from the moment the external synchronous signal 20 is activated to the moment the external synchronous signal 20 is activated again in the next place, namely for a period of one line printing, the synchronism register 10 will in no way be initialized, and therefore, the synchronism register 10 is maintained in a condition of indicating the "HFP" period. Accordingly, the content of the address register 15, namely, the printing address is not updated. This makes it possible to supply a proper address even if a printing time required until the printing-out of one line has been completed greatly varies. In other words, it is possible to realize an external synchronism control circuit which can be adapted to the printer system by effectively utilizing the function of only one CRT controller LSI without modification and without additional circuits.

Figure 6:
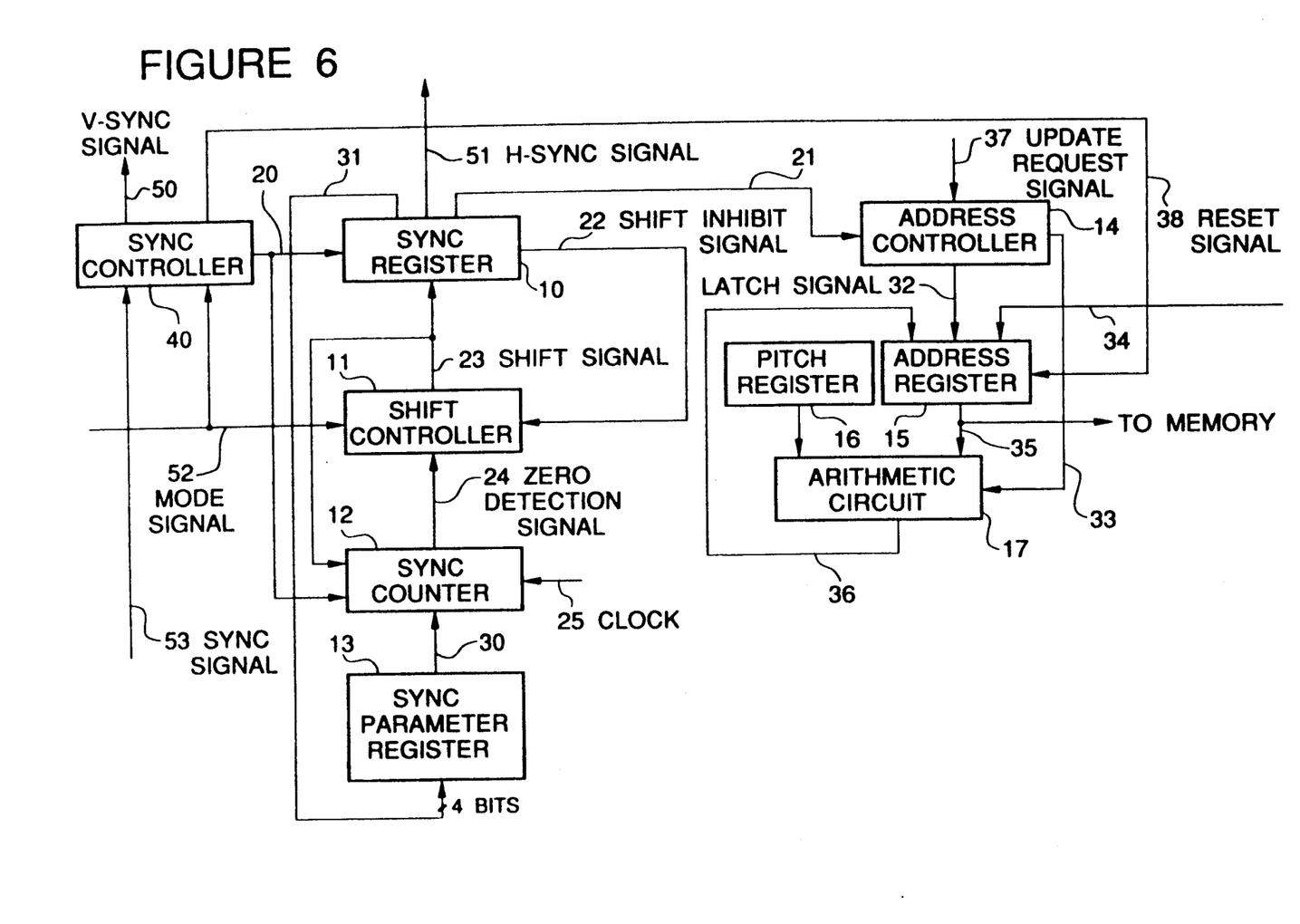
FIG. 6 is a block diagram of a second embodiment of the external synchronism control circuit in accordance with the present invention.

Referring to FIG. 6, there is shown a second embodiment of the synchronism control circuit in accordance with the present invention. This second embodiment has a master mode for controlling a CRT display or similar devices, and a slave mode using the external synchronism control function. When the slave mode is selected, the second embodiment can realize an external synchronism control function similar to that obtained in the first embodiment. On the other hand, when the master mode is selected, it is possible to control the CRT display.

The synchronism control circuit shown in FIG. 6 includes a synchronism controller 40 and outputs a vertical synchronous signal 50 and a horizontal synchronous signal 51 and receives a mode signal 52 for a master/slave selection and a synchronous signal 53. The other points are the same as those shown in FIG. 4, and therefore, elements similar to those shown in FIG. 4 are given the same Reference Numerals.

When the mode signal 52 is of "0", the slave mode is selected, and the shown synchronism control circuit functions as the external synchronism control circuit for the printer. In this slave mode, the synchronous signal 53 is selected as the external synchronous signal so that an operation similar to that of the first embodiment is performed. Namely, the synchronism controller 40 receives the synchronous signal 53 from the printer controller 3 and outputs it without modification to the synchronism register 10 as the external synchronous signal 20 and as the reset signal 38. In addition, when the mode signal 52 is of "0", the shift controller 11 operates to activate the shift signal 23 when the shift inhibit signal is inactive and the zero detection signal 24 is active.

When the mode signal 52 is of "1", the master mode is selected, and the shown synchronism control circuit functions as the external control circuit for the CRT display so that the vertical synchronous signal 50 and the horizontal synchronous signal 51 are generated at predetermined constant intervals, respectively. Namely, the synchronism controller 40 generates the vertical synchronous signal 50 at predetermined constant intervals. This signal can be easily generated by using, for example, a counter. The vertical synchronous signal 50 is supplied as the reset signal 38, and on the other hand, the synchronous signal 53 is supplied as the external synchronous signal 20. When the mode signal 52 is of "1", the shift controller 11 operates the zero detection signal 24 as the shift signal 23 without modification. Therefore, the "HFP" period is automatically moved to the "HS" period. Thus, the horizontal synchronous signal 51 is activated when the synchronism register 10 indicates the "HS" period, namely, the content of the synchronism register 10 is "0001".

Accordingly, the print enable signal 21 is outputted at constant intervals. In response to the update request signal similarly supplied at constant intervals, the address controller 14 generates the latch signal 32 at constant intervals. Thus, the display is properly controlled.

As seen from the above, the second embodiment can selectively comply with the CRT display and the printer apparatus, only by adding the synchronism controller 40 and by switching over the mode.

As will be apparent from the above description of the embodiments, the external synchronism control circuit in accordance with the present invention can properly generate a display (print) address in synchronism with an external synchronous signal supplied at irregular intervals, and therefore, is very effective in making easy the design of the hardware of the printer, and in reducing the cost of the printer. In addition, if the external synchronism control circuit in accordance with the present invention is incorporated in a CRT controller LSI having a graphic depicting function of a high performance, a printer system having a high function can be provided. In other words, a large advantage can be obtained by a relatively simple external synchronism circuit.

In addition, if the external synchronism control circuit in accordance with the present invention includes a selection circuit for selecting either the master mode for the CRT display or the slave mode for printing for example by a printer, one LSI can comply with both of the CRT display and the printer. This can give a large mass production effect in comparison with the case in which two kinds of LSI are manufactured, and also can greatly reduce the total manufacturing cost.

The invention has thus been shown and described with reference to the specific embodiments. However, it should be noted that the present invention is in no way limited to the details of the illustrated structures but changes and modifications may be made within the scope of the appended claims. For example, the bit length of the address and the data is not limited to the specific values shown in connection with the disclosed embodiment, and even if memories and registers having an arbitrary address space and an arbitrary data length can be used, a similar effect can be obtained.

I claim:

1. An external synchronism control circuit triggered in synchronism with an external synchronous signal so as to successively generate addresses to a memory storing image information, comprising:

synchronism register means for receiving said external synchronous signal and capable of holding a plurality of set values, a content of said synchronism register being set to an initial value of said plurality of set values when said external synchronous signal is applied;

synchronism parameter register means for holding a plurality of preset count values and receiving, as an address, one of said set values output from said synchronism register means so as to output one preset count value designated by said received address;

synchronism counter means coupled to said synchronism parameter register means and being set with the one preset count value from said synchronism parameter register means in response to said external synchronous signal, said synchronism counter means being decremented by a clock signal and operating to generate a zero detection signal when a content of said synchronism counter means becomes zero;

shift controller means coupled to said synchronism counter means for receiving said zero detection signal and operating to output a shift for receiving said zero detection signal and operating to output a shift signal to said synchronism register means so as to cause the one of said set values output from said synchronism register means to be shifted to another one of said set values, said synchronism register means operating to output an shift inhibit signal to said shift controller means when said synchronism register means holds said final value of said plurality of set values, said shift controller means updating the content of said synchronism register means from one set value to another set value when a predetermined period of time has elapsed; and address updating means coupled to said synchronism register means for sequentially updating said address from a period in which said synchronism register means holds a predetermined set value of said plurality of set values until a period in which said synchronism register means is in a condition of holding said final value, said address updating means supplying the updated address to said memory.

2. The external synchronism control circuit claimed in claim 1 wherein said address updating means comprises:

address register means coupled to a data bus from a printer controller for storing a content of a printing address, said printing address being supplied to said memory;

pitch register means for storing a number of words to be added to a content of said address register means when starting a new print line;

arithmetic circuit means coupled to said address register means and said pitch register means for adding a content of said pitch register means to a content of said address register means and storing a resulting sum in said address register means; and address controller means coupled to said synchronism register means and responsive to a print enable signal generated by said synchronism register means for generating a latch signal to said address register means to latch an address on said data bus from the printer controller and an operation instruction signal to said arithmetic circuit means to control the adding of a content of said pitch register means to a content of said address register means.

3. An external synchronism control circuit claimed in claim 1 wherein when said synchronism register means holds said predetermined set value of said plurality of set values, said synchronism register means outputs a print enable signal, and when said print enable signal is active, said address updating means sequentially updates said address to be supplied to said memory.

4. The external synchronism control circuit claimed in claim 1 further comprising synchronism controller means responsive to a mode signal defining a slave mode and a master mode, said synchronism controller when in said slave mode passing a sync signal to said synchronism register means and said synchronous counter means as said external synchronous signal and when in said master mode generating a vertical sync signal and controlling said synchronous register means to generate a horizontal sync signal in response to said sync signal.

5. A printer system comprising:

printer controller means for receiving control information and character and graphic information from an external computer for extracting said character and graphic information and for generating internal control signals and a synchronous signal;

internal image memory means for storing character and graphic information to be printed;

printing hardware means coupled to said internal image memory and controlled by said printer controller means for printing said character and graphic information;

graphic information writer means for receiving said extracted character and graphic information and writing character and graphic information into said internal image memory means; and print address generator means for receiving said synchronous signal and said internal control signals from said printer controller for sequentially supplying a print address to said internal image memory means so as to cause a print information to be read out of said internal image memory means to said printing hardware means, said print address generator means comprising:

synchronism register means for receiving said external synchronous signal and capable of holding a plurality of set values, a content of said synchronism register means being set to an initial value of said plurality of set values when said external synchronous signal is applied;

synchronism parameter register means for holding a plurality of preset count values and receiving, as an address, one of said set values output from said synchronism register means so as to output one preset count value designated by said received address;

synchronism counter means coupled to said synchronism parameter register means and being set with the one preset count value from said synchronism parameter register means in response to said external synchronous signal, said synchronism counter means being decremented by a clock signal and operating to generate a zero detection signal when a content of said synchronism counter means becomes zero;

shift controller means coupled to said synchronism counter means for receiving said zero detection signal and operating to output a shift signal to said synchronism register means so as to cause the one of said set values output from said synchronism register means to be shifted to another one of said set values, said synchronism register means operating to output an shift inhibit signal to said shift controller means when said synchronism register means holds said final value of said plurality of set values, said shift controller means updating the content of said synchronism register from one set value to another set value when a predetermined period of time has elapsed; and address updating means for sequentially updating said address from a period in which said synchronism register means holds a predetermined set value of said plurality of set values until a period in which said synchronism register means is in a condition of holding said final value, said address updating means supplying the updated address to said internal image memory means.

6. The printer system claimed in claim 5 wherein when said synchronism register means holds said predetermined set value of said plurality of set values, said synchronism register means outputs a print enable signal, and when said print enable signal is active, said address update means sequentially updates said address to be supplied to said internal memory means.

7. The printer system as claimed in claim 6 wherein said plurality of preset count values held by said synchronism parameter register means correspond to a horizontal sync period, a horizontal back porch period, a horizontal display period, and a horizontal front porch period, said print enable signal being generated by said synchronism register means during said horizontal display period.

8. The printer system claimed in claim 5 wherein said address updating means comprises:

address register means coupled to a data bus from a printer controller for storing a content of a printing address, said printing address being supplied to said memory;

pitch register means for storing a number of words to be added to a content of said address register means when starting a new print line;

arithmetic circuit means coupled to said address register means and said pitch register means for adding a content of said pitch register means to a content of said address register means and storing a resulting sum in said address register means; and address controller means coupled to said synchronism register means and responsive to a print enable signal generated by said synchronism register means for generating a latch signal to said address register means to latch an address on said data bus from the printer controller and an operation instruction signal to said arithmetic circuit means to control the adding of a content of said pitch register means to a content of said address register means.

9. The printer system claimed in claim 5 further comprising synchronism controller means responsive to a mode signal defining a slave mode and a master mode, said synchronism controller when in said slave mode passing a sync signal to said synchronism register means and said synchronous counter means as said external synchronous signal and when in said master mode generating a vertical sync signal and controlling said synchronous register means to generate a horizontal sync signal in response to said sync signal.

* * * * *